(12) United States Patent
Lee et al.

(10) Patent No.: US 7,440,695 B2
(45) Date of Patent: Oct. 21, 2008

(54) OPTICAL TRANSMISSION LINE MONITORING SYSTEM USING A GAIN CLAMPED OPTICAL AMPLIFIER

(75) Inventors: Han Hyub Lee, Daejeon (KR);
Donghan Lee, Daejeon (KR); Hee Sang Chung, Daejeon (KR); Kwangjoon Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 546 days.

(21) Appl. No.: 10/968,308

(22) Filed: Oct. 18, 2004

(65) Prior Publication Data

US 2005/0271384 A1 Dec. 8, 2005

(30) Foreign Application Priority Data

Jun. 2, 2004 (KR) .................... 10-2004-0039985

(51) Int. Cl.
*H04B 10/08* (2006.01)
(52) U.S. Cl. .......................................... 398/28; 398/37
(58) Field of Classification Search .................. 398/33, 398/13, 37, 28
See application file for complete search history.

(56) References Cited

U.S. PATENT DOCUMENTS

| | | | | |
|---|---|---|---|---|
| 5,870,183 | A * | 2/1999 | Povlsen et al. | 356/73.1 |
| 6,009,220 | A * | 12/1999 | Chan et al. | 385/24 |
| 6,542,228 | B1 * | 4/2003 | Hartog | 356/73.1 |
| 6,950,232 | B1 * | 9/2005 | Yam | 359/341.5 |
| 7,046,349 | B2 * | 5/2006 | Everall et al. | 356/73.1 |
| 2005/0088724 | A1 * | 4/2005 | Lee et al. | 359/333 |

FOREIGN PATENT DOCUMENTS

| KR | 2000-0002619 | | 1/2000 |
|---|---|---|---|
| KR | 000002619 | * | 1/2000 |

OTHER PUBLICATIONS

Lutz C. Blank et al., "Optical Time Domain Reflectometry on Optical Amplifier Systems," Journal of Lightwave Technology, vol. 7, No. 10. Oct. 1989, pp. 1549-1555.
Yoshiaki Sato, et al., "Optical Time Domain Reflectometry in Optical Transmission Lines Containing In-Line Er-Doped Fiber Amplifier," Journal of Lightwave Technology, vol. 10, No. 1, Jan. 1992, pp. 78-83.

(Continued)

*Primary Examiner*—Leslie Pascal
(74) *Attorney, Agent, or Firm*—Blakely, Sokoloff, Taylor & Zafman (57) ABSTRACT

There are provided a method and system for monitoring an optical transmission line. The system for monitoring the optical transmission line includes: an OTDR (optical time-domain reflectometer) transmitting a monitoring light to an optical transmission line, measuring a reflected light or backscattered light to monitor the optical transmission line; an optical amplification unit amplifying the monitoring light transmitted on the optical transmission line by using a gain clamped optical amplifier; and a filter unit removing a component having a wavelength outside a wavelength band of the monitoring light from a backward ASE (amplified spontaneous emission) generated by the optical amplification unit. Accordingly, it is possible to extend an optical transmission line monitoring distance of the OTDR. As a result, it is possible to prevent deterioration of the performance of the OTDR because of the backward ASE.

6 Claims, 7 Drawing Sheets

OTHER PUBLICATIONS

S. Seikai et al., "Application of an $Er^{3+}$-Doped Febre Amplifier To An OTDR Operating at 1.6 μm," Electronics Letters, Jul. 21, 1994, vol. 30, No. 15, pp. 1225-1226.

Shin-Ichi Furukawa et al., "Enhanced Coherent OTDR for Long Span Optical Transmission Lines Containing Optical Fiber Amplifiers," IEEE Photonics Technology Letters, ol. 7, No. 5, May 1995, pp. 5440-542.

Y.W. Lai et al., "Novel Supervisory Technique Using Wavelength-Division-Multiplexed OTDR in EDFA Repeatered Transmission Systems," IEEE Photonics Technology Letters, vol. 6, No. 3, Mar. 1994, pp. 446-449.

* cited by examiner

OPTICAL TRANSMISSION LINE MONITORING SYSTEM USING A GAIN CLAMPED OPTICAL AMPLIFIER

This application claims the priority of Korean Patent Application No. 2004-39985, filed on Jun. 2, 2004, in the Korean Intellectual Property Office, the disclosure of which is incorporated herein in its entirety by reference.

BACKGROUND OF THE INVENTION

1. Field of the Invention

The present invention relates to a method and system for monitoring an optical transmission line, and more particularly, to a method and system for monitoring an optical transmission line by using an optical time-domain reflectometer (OTDR) and an optical amplifier.

2. Description of Related Art

The optical time domain reflectometry (OTDR) is very convenient to monitor WDM transmission links. In order to solve problems in the transmission line quickly and further to prevent potential problems, online monitoring at a central office is necessary. However, the monitoring distance with a typical OTDR is limited to about 160 km of optical fiber because of the dynamic range of avalanche photo diode (~35 dB). To further extend the monitoring length, amplified OTDR systems using optical amplifiers have been investigated, and then, the defective positions of the optical transmission line and the loss of transmission measured by the OTDR are used to improve reliability of an optical transmission system.

Typically, amplification of the monitoring light of the OTDR results in backward amplified spontaneous emission (ASE), which is generated by the optical amplifier. In turn, the ASE may deteriorate performance of the OTDR. In an optical transmission line monitoring system with multiple amplification stages, the performance of the OTDR may be greatly deteriorated because of ASE components outside a wavelength band of the monitoring light. Therefore, it is necessary to remove the ASE components outside a wavelength band of the monitoring light.

Figure 1:
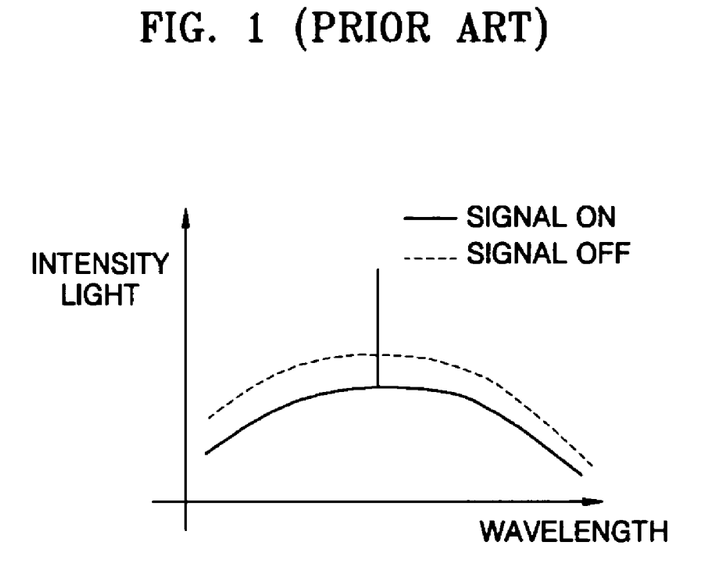
FIG. 1 is a graph showing optical spectra of outputs of an optical amplifier in the on and off states of an input signal.

Since the monitoring light of the OTDR is a pulsed light, a signal input to the optical amplifier is periodically in on and off states. When the input signal of the optical amplifier is in the off state, the ASE from optical amplifier greatly increases. Therefore, there is a difference in the power of ASE between the on and off states of the input signal. If a pumping operation for increasing gain of the optical amplifier is intensively performed, the difference in the ASE may be further enlarged. Since the ASE generated in the off state of the input signal becomes a background noise, the operating characteristics of photo diodes in the receiver of the OTDR may be deteriorated. In addition, results of monitoring will be distorted FIG. 1 is a graph showing optical spectra of outputs of an optical amplifier with or without a signal The ASE without a signal is larger than that with a signal. Because of the difference in the ASE, the performance of the OTDR will be deteriorated.

SUMMARY OF THE INVENTION

The present invention provides an optical transmission line monitoring system using an optical amplifier and an OTDR (optical time-domain reflectometer) capable of monitoring a long optical transmission line, preventing deterioration of performance of the OTDR because of a backward ASE (amplified spontaneous emission) generated by the optical amplifier, and simultaneously performing signal transmission and optical transmission line monitoring.

According to an aspect of the present invention, there is provided an optical transmission line monitoring system comprising: an OTDR (optical time-domain reflectometer) transmitting a monitoring light to an optical transmission line, measuring a reflected light or backscattered light to monitor the optical transmission line; an optical amplification unit amplifying the monitoring light transmitted on the optical transmission line by using a gain clamped optical amplifier; and a filter unit removing a component having a wavelength outside a wavelength band of the monitoring light from a backward ASE (amplified spontaneous emission) generated by the optical amplification unit.

According to another aspect of the present invention, there is provided a method of monitoring an optical transmission line, comprising: transmitting an monitoring light on the optical transmission line; amplifying the monitoring light by using a gain clamped optical amplifier and maintaining an power of a backward ASE (amplified spontaneous emission) constant regardless of an power of the monitoring light; removing ASE outside a wavelength band of the monitoring light; and monitoring the optical transmission line by measuring intensities of reflected light or backscattered light generated from the monitoring light.

Accordingly, it is possible to extend an optical transmission line monitoring distance of the OTDR. As a result, it is possible to prevent deterioration of the performance of the OTDR because of the backward ASE.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention and operational advantages thereof can be fully understood by referring to the accompanying drawings and explanations thereof.

Now, exemplary embodiments of the present invention will be described with reference to the accompanying drawings to explain the present invention in detail. In the drawings, the same reference numerals indicate the same elements.

Now, an optical transmission line monitoring system using a gain clamped optical amplifier according to the present invention will be described with reference to the drawings.

Figure 2:
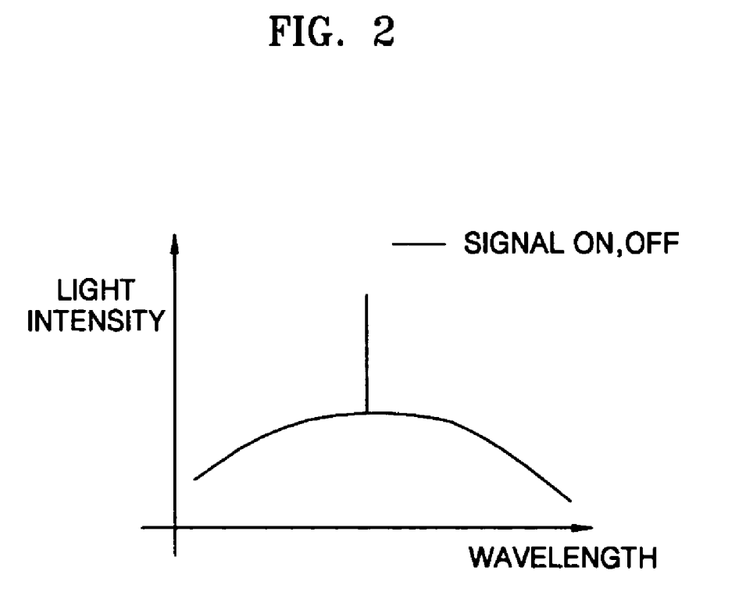
FIG. 2 is a graph showing optical spectra of outputs of a gain clamped optical amplifier in the on and off states of an input signal.

FIG. 2 is a graph showing optical spectra of outputs of a gain clamped optical amplifier in the on and off states of an input signal;

As shown in FIG. 2, a power of an amplified spontaneous emission (ASE) does not change regardless of the on and off states of a signal within a predetermined signal wavelength band.

Figure 3A:
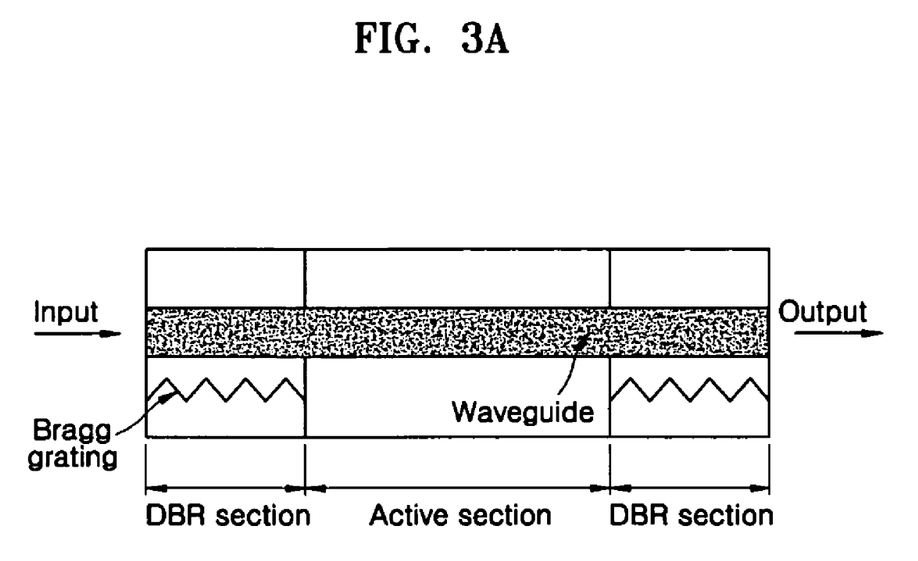
FIGS. 3a and 3b are view showing a structure of a gain clamped semiconductor optical amplifier using Bragg gratings.
Figure 3B:
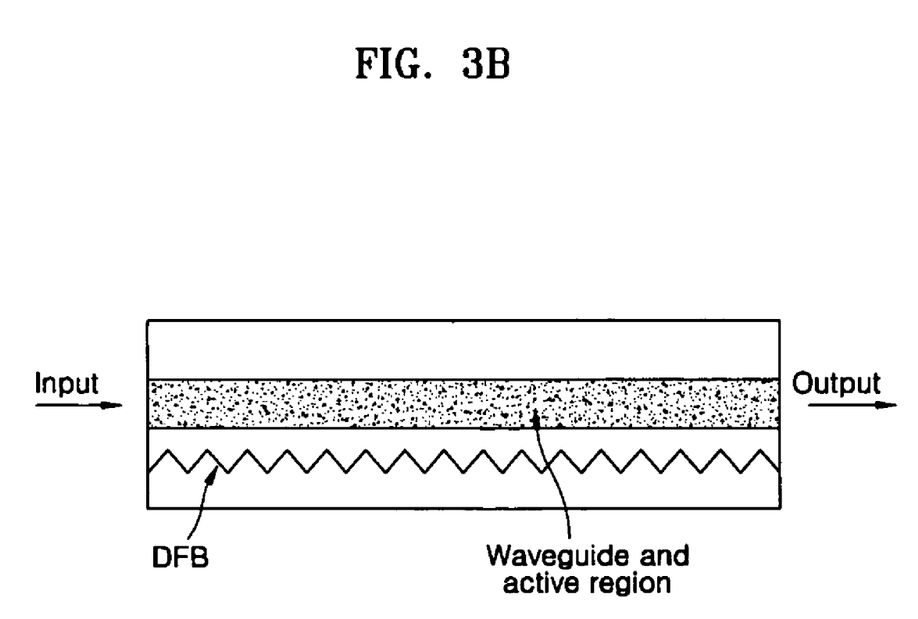
Figure 4:
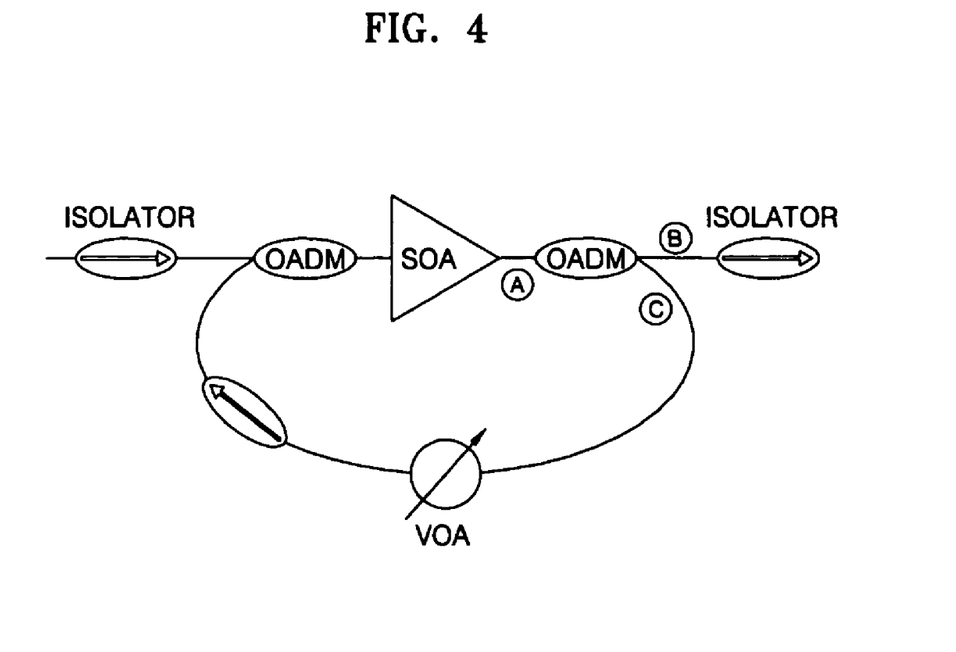
FIG. 4 is a view showing a gain clamped optical amplifier in which a laser cavity provided outside a semiconductor optical amplifier.

FIG. 3A, 3B, and 4 are views showing examples of a gain clamped optical amplifier.

FIGS. 3A and 3B are view showing structures of gain clamped semiconductor optical amplifiers using Bragg gratings. FIG. 3A shows a gain clamped semiconductor optical amplifier having Bragg gratings at both ends of a semiconductor chip (an active section), which is called a "distributed Bragg reflector (DBR) type." FIG. 3B shows a gain clamped optical amplifier having a Bragg grating under a waveguide an active region, which is called a "distributed feedback (DFB) type."

More specifically, the SOA comprises the structure of a laser cavity in the optical waveguide, which a gain medium. The structure of the laser cavity is formed with Bragg gratings reflecting light in a predetermined narrow wavelength band. The laser oscillating in the laser cavity is used to saturate gain of the SOA. If the power of the input of the SOA is low, the power of the laser increases so that the gain of the SOA is saturated. If the power of the input of the SOA is high, the power of the laser decreases. But, since the power of the input is high, the gain the SOA is saturated. Therefore, the gain of the gain clamped SOA can be saturated regardless of the power of the input of the SOA, so that a constant signal gain can be obtained. In addition, since the SOA is always in a gain saturated state, the power of the ASE can be kept constant.

FIG. 4 is a view showing a gain clamped optical amplifier in which a laser cavity provided outside a semiconductor optical amplifier; there are provided two optical add-drop multiplexers (OADMs). A second OADM connected to the output of the SOA has three terminals A, B, and C. Having a predetermined wavelength, a portion of light input to the terminal A is output from the terminal C. The power of the light having the predetermined wavelength output from the terminal C is adjusted by a variable optical attenuator (VOA) and input to the SOA through a first OADM. In one cycle, the light output from the terminal C of the second OADM is amplified the SOA, and then, input to the terminal A of the second OADM. This cycle is repeated to generate resonance. The laser having this cavity structure is called a ring laser.

Figure 5:
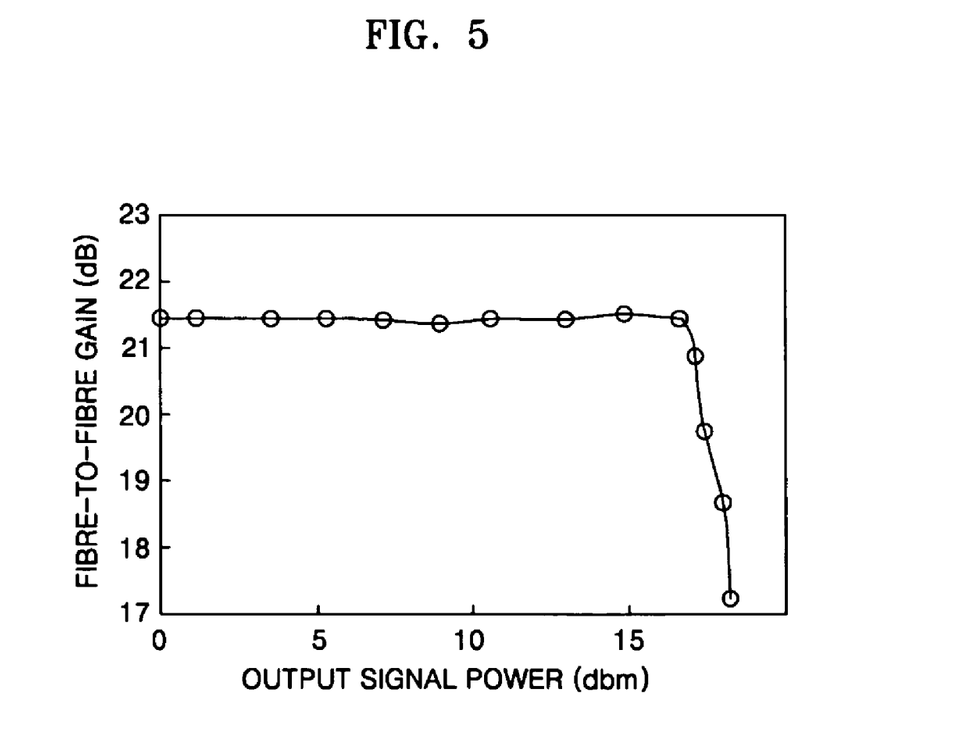
FIG. 5 is a gain characteristic of a gain clamped optical amplifier.

FIG. 5 is a gain characteristic curve of a gain clamped optical amplifier. As shown in FIG. 5, it can be seen that, since the SOA is kept in a constant gain saturated state, the gain is constant regardless of the power of the input signal.

Figure 6:
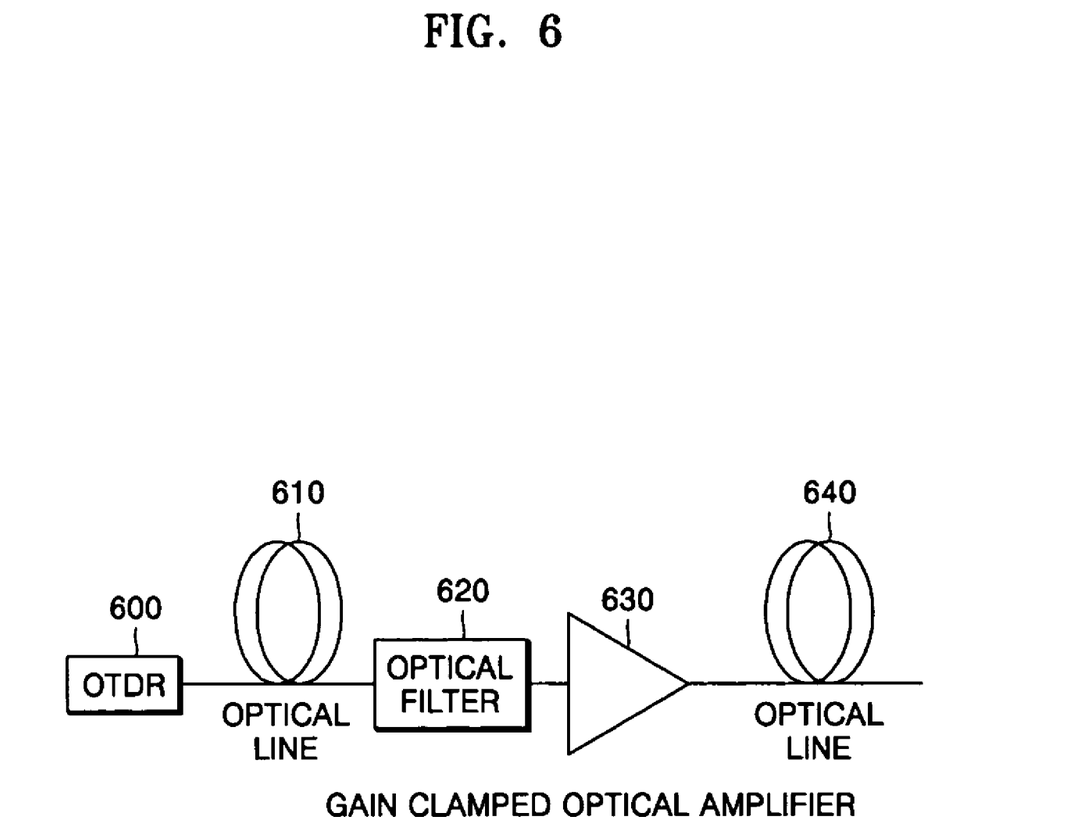
FIG. 6 is a view showing an optical transmission line monitoring system according to an example of the present invention.

FIG. 6 is a view showing an optical transmission line monitoring system according to an example of the present invention.

The optical transmission line monitoring system comprises an OTDR (optical time-domain reflectometer) 600, optical transmission lines 610 and 640, an optical filter 620, and a gain clamped optical amplifier 630.

A monitoring light input to the optical transmission line 610 is reflected or back-scattered. The OTDR 600 measures the reflected or back-scattered light to determine loss of transmission of the optical transmission line 610, connection points, disconnection points, and so on. The monitoring light of the OTDR 600 is a periodical pulsed light. Since there are limitations on the output power of the monitoring light and the dynamic range of a photo diode in the receiver of the OTDR 600, only a single OTDR 600 can not monitor over 150 km of the optical transmission line.

In order to extend the monitoring distance of the OTDR 600, the gain clamped optical amplifier 630 amplifies the monitoring light (the pulsed light) of the OTDR 600. Since the gain clamped optical amplifier 630 has a constant gain regardless of the power of the input signal thereof, the power of the ASE is constantly regardless of the power of the monitoring light.

Now, the gain clamped optical amplifier will be described in detail with reference to FIGS. 2 to 5.

The optical filter 620 used between the OTDR 600 and the gain clamped semiconductor optical amplifier 630 has a function of removing components outside a wavelength band of the monitoring light from the backward ASE generated by the gain clamped optical amplifier 630.

The power of the ASE can be kept constant by the gain clamped optical amplifier 630 regardless of the on and off state of the monitoring light (a pulsed light). The components outside the wavelength band of the monitoring light can be removed from the backward ASE by the optical filter 620. As a result, it is possible to prevent deterioration of the performance of the OTDR because of the ASE.

Figure 7:
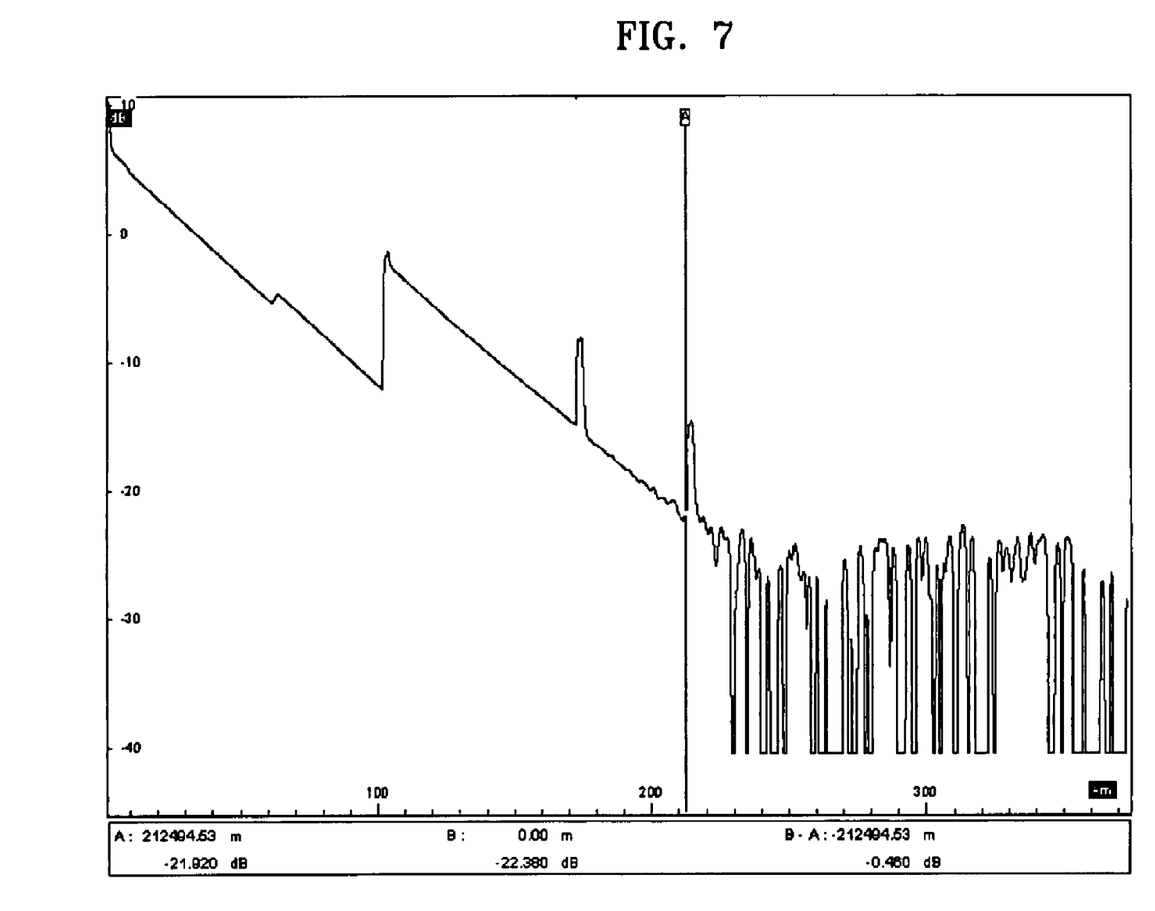
FIG. 7 is a graph showing a monitoring result of the optical transmission line monitoring system of FIG. 6.

FIG. 7 is a graph showing a monitoring result of the optical transmission line monitoring system of FIG. 6. As the monitoring light proceeds along the optical transmission line, the power of the monitoring light is gradually reduced. Next, the monitoring light is amplified by the optical amplifier at about 100 km. Therefore, it is possible to extend the monitoring distance of the OTDR.

As seen in FIG. 7, it can be understood that the monitoring distance of the OTDR extends over 200 km.

Figure 8:
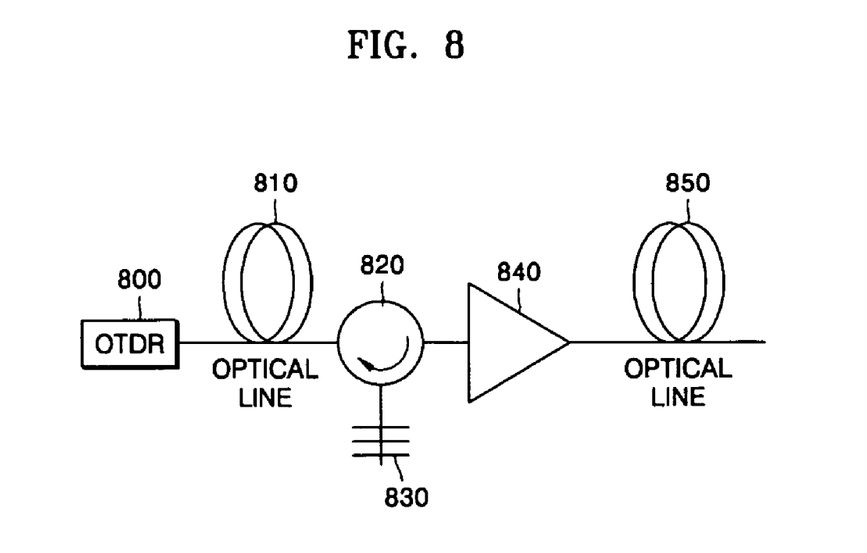
FIG. 8 is a view showing an optical transmission line monitoring system according to another example of the present invention.

FIG. 8 is a view showing an optical transmission line monitoring system according to another example of the present invention.

The optical transmission line monitoring system comprises an OTDR 800, optical transmission lines 810 and 850, a circulator 820, an optical fiber grating 830, and a gain clamped optical amplifier 840.

The constructions and functions of the OTDR 800, the gain clamped optical amplifier 840, and the optical transmission lines 810 and 850 are the same as those of FIG. 6. Therefore, the detailed description is omitted.

Light transmitted on the optical transmission line 810 is input to the gain clamped optical amplifier 840 though the circulator 820. A light backwardly output from the gain clamped optical amplifier 840 is input to the optical fiber grating 830 though the circulator 820. A light reflected on the optical fiber grating 830 is input to the optical transmission line 810 through the circulator 820.

The optical fiber grating 830 reflects only the components within the wavelength band of the backward monitoring light which is amplified by the gain clamped optical amplifier 840. In other words, the circulator 820 and the optical fiber grating 830 of FIG. 8 collectively correspond to the optical filter of FIG. 6.

Figure 9:
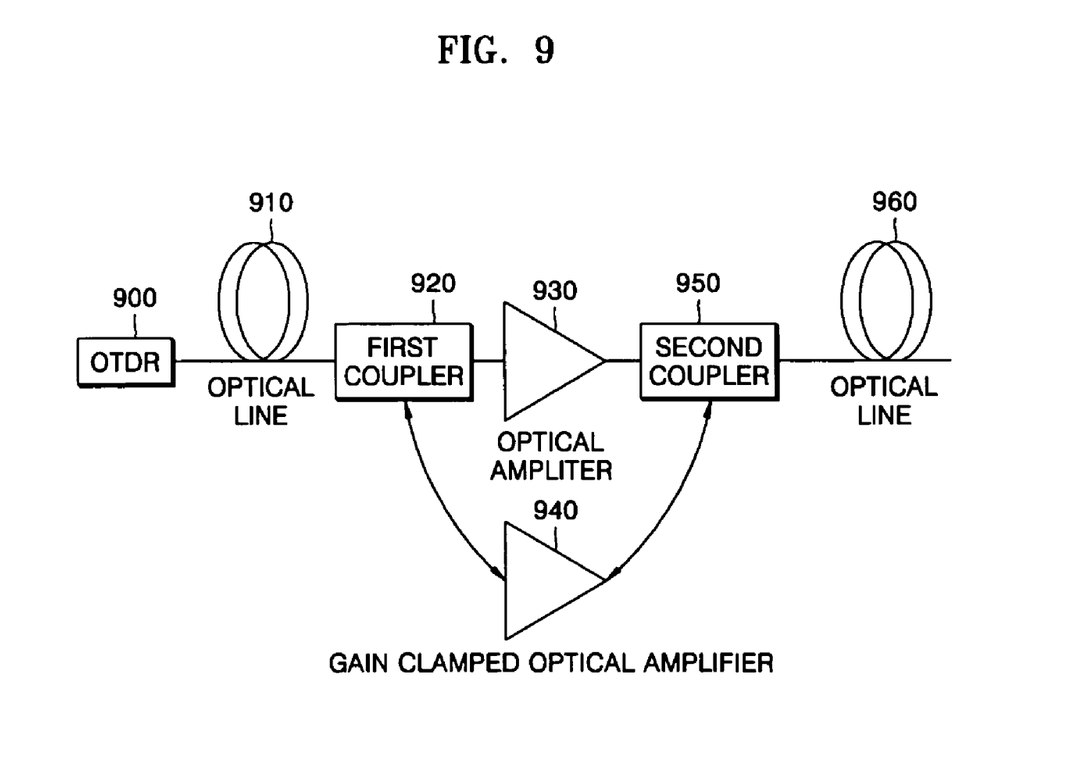
FIG. 9 is a view showing an optical transmission line monitoring system using an optical amplifier for data signal on an optical transmission line according to an example of the present invention.

FIG. 9 is a view showing an optical transmission line monitoring system using an optical amplifier for data signal on an optical transmission line according to an example of the present invention;

The optical transmission line monitoring system comprises an OTDR 900, optical transmission lines 910 and 960, a first coupler 920, a gain clamped optical amplifier 940, a second coupler 950, and an optical amplifier 930. The gain clamped optical amplifier 940 amplifies the monitoring light. The optical amplifier 930 amplifies the data signal.

The OTDR 900 and the gain clamped optical amplifier 940 are the same as those of FIG. 6. Therefore, detailed description is omitted.

The first coupler 920 used in front of the optical amplifier 930 demultiplexes both data signal and monitoring light output from the OTDR 900. The first coupler 920 transmits the data signal and the monitoring light to the optical amplifier 930 and the gain clamped optical amplifier 940, respectively.

The optical amplifier 930 and the gain clamped optical amplifier 940 amplify the data signal and the monitoring light, respectively. The second coupler 950 multiplexes the data signal from the optical amplifier 930 and the monitoring light from the gain clamped optical amplifier 940 and outputs the combined light to the optical transmission line 960.

The backscattered monitoring light or the reflected monitoring light is backwardly input to the gain clamped optical amplifier 940 through the second coupler 950.

Figure 10:
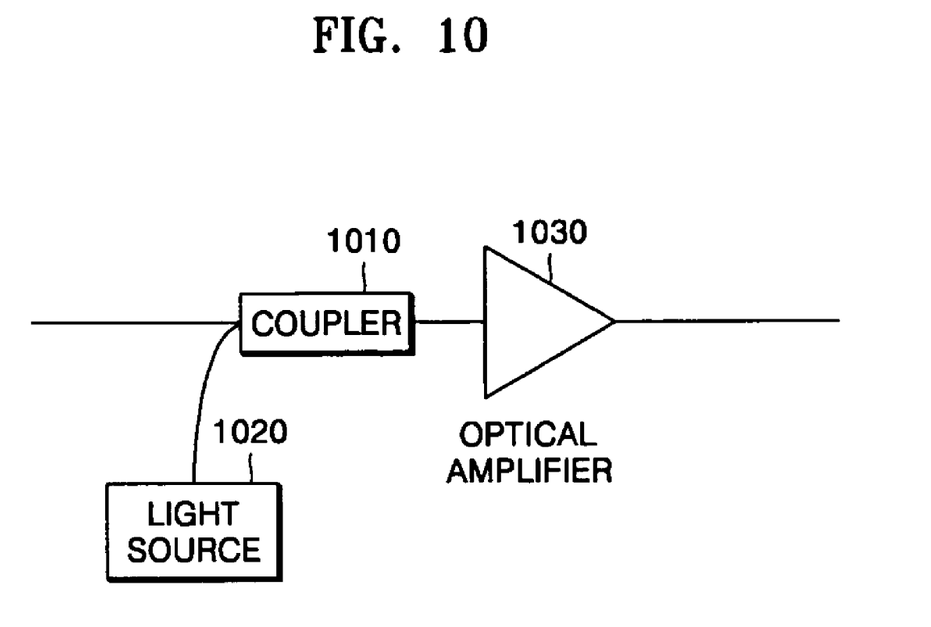
FIG. 10 is a view showing a gain clamped optical amplifier using a gain-saturated signal.

FIG. 10 is a view showing an example of a gain clamped optical amplifier using a gain-saturated signal.

The gain clamped optical amplifier comprises a light source 1020 generating the gain-saturated signal, an optical amplifier 1030, and a coupler 1010 inputting the gain-saturated signal to the optical amplifier 1030.

The gain-saturated signal generated by the light source 1020 is input to the optical amplifier 1030 through the coupler 1010. Here, the gain-saturated signal has enough high power to uniformly saturate the gain of the optical amplifier 1030 regardless of the monitoring light. Therefore, it is possible to obtain a constant signal gain at any time.

Figure 11:
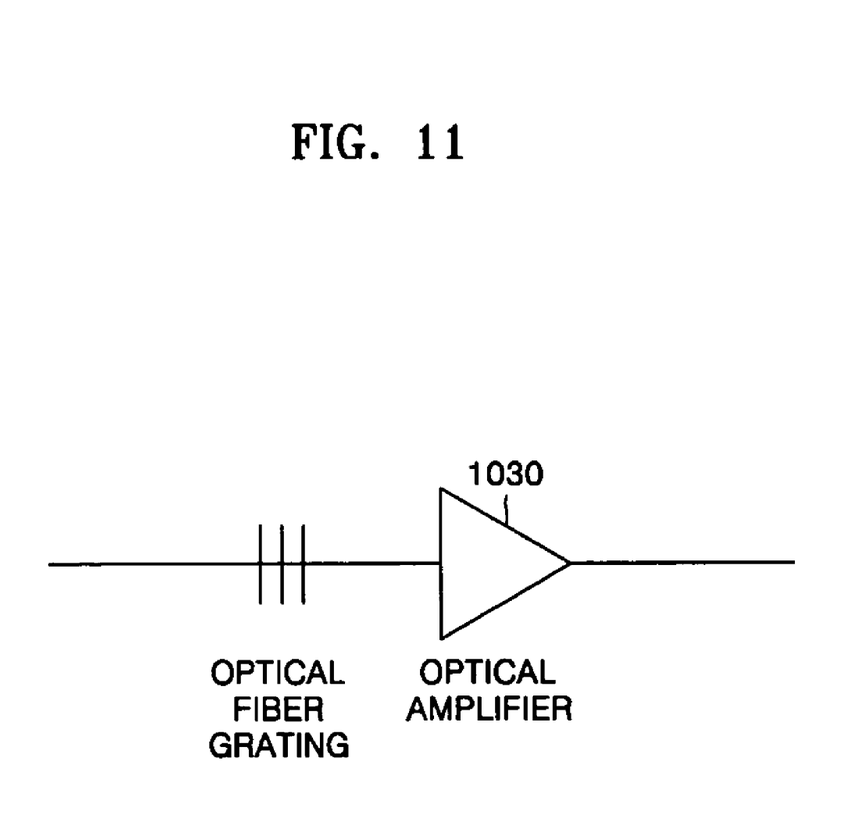
FIG. 11 is a view showing a gain clamped optical amplifier using an optical grating.

FIG. 11 is a view showing another example of a gain clamped optical amplifier using an optical grating.

The gain clamped optical amplifier comprises an optical fiber grating 1110 and an optical amplifier 1120. The optical fiber grating 1110 has a function of reflecting a portion of ASE generated by the optical amplifier 1120 to the optical amplifier 1120. The reflected portion of ASE is contributed to saturate the gain of the optical amplifier 1120, so that the signal gain can be constant.

The reflection wavelength band of the optical fiber grating 1110 is empirically determined. Wider reflection wavelength band is preferable because sufficient reflected light has to be input to the optical amplifier 1120 in order to saturate the gain of the optical amplifier 1120.

Since the light source and the coupler of FIG. 10 can be replaced with a single optical grating, it is possible to implement a low-price gain clamped optical amplifier.

According to the present invention, in case of extending an optical transmission line monitoring distance of an optical time-domain reflectometer (OTDR) by using an optical amplifier, it is possible to prevent deterioration of performance of the OTDR because of backward amplified spontaneous emission (ASE) generated from the optical amplifier. In addition, since a data signal and a monitoring light have different wavelengths, it is possible to monitor the optical transmission line in real time In addition, the present invention can be adapted to an optical transmission line on which a optical amplifier. In addition, a long optical transmission line can be monitored by a gain clamped optical amplifier. Therefore, it is possible to reduce time and cost in monitoring the optical transmission line.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical transmission line monitoring system comprising:
   an OTDR (optical time-domain reflectometer) transmitting a monitoring light to an optical transmission line, measuring a reflected light or backscattered light to monitor the optical transmission line;
   an optical amplification unit amplifying the monitoring light transmitted on the optical transmission line by using a gain clamped optical amplifier; and
   a filter unit removing a component having a wavelength outside of a wavelength band of the monitoring light from a backward ASE (amplified spontaneous emission) generated by the optical amplification unit;
   wherein the optical amplification unit amplifies the monitoring light so that the power of the backward ASE generated from the amplification of monitoring light is kept constant.

2. The optical transmission line monitoring system according to claim 1, wherein the filter unit comprises:
   a circulator removing the component having a wavelength outside the wavelength band of the monitoring light from the backward ASE; and
   an optical fiber grating reflecting a component having a wavelength inside the wavelength band of the monitoring light out of the backward ASE.

3. The optical transmission line monitoring system according to claim 1, wherein the optical amplification unit amplifies the monitoring light by using a semiconductor optical amplifier so that the power of the backward ASE generated from the amplification of monitoring light is kept constant, and wherein the semiconductor optical amplifier has internal or external laser cavities.

4. The optical transmission line monitoring system according to claim 1, wherein the optical amplification unit amplifies the monitoring light by using an external optical amplifier using a gain-saturated signal so that the power of the backward ASE generated from the amplification of monitoring light is kept constant.

5. The optical transmission line monitoring system according to claim 1, wherein the optical amplification unit amplifies the monitoring light by using an optical amplifier having an optical fiber grating at input stage thereof.

6. The optical transmission line monitoring system according to claim 1, further comprising:
   a first coupler which demultiplexes light on the optical transmission line into a data signal and the monitoring light of the OTDR and transmits the monitoring light to the optical amplification unit; and
   a second coupler which demultiplexes the data signal and the amplified monitoring light and transmits the combined light on the optical transmission line.

* * * * *